INVENTORS
WILLIAM L. FRY
ALBERT F. UHLIG
BY W. A. Schalch
and John R. Nelson
ATTORNEYS Aug. 20, 1963    W. L. FRY ETAL    3,101,147
GLASS CONTAINER INSPECTING APPARATUS
Filed May 17, 1961    3 Sheets-Sheet 3

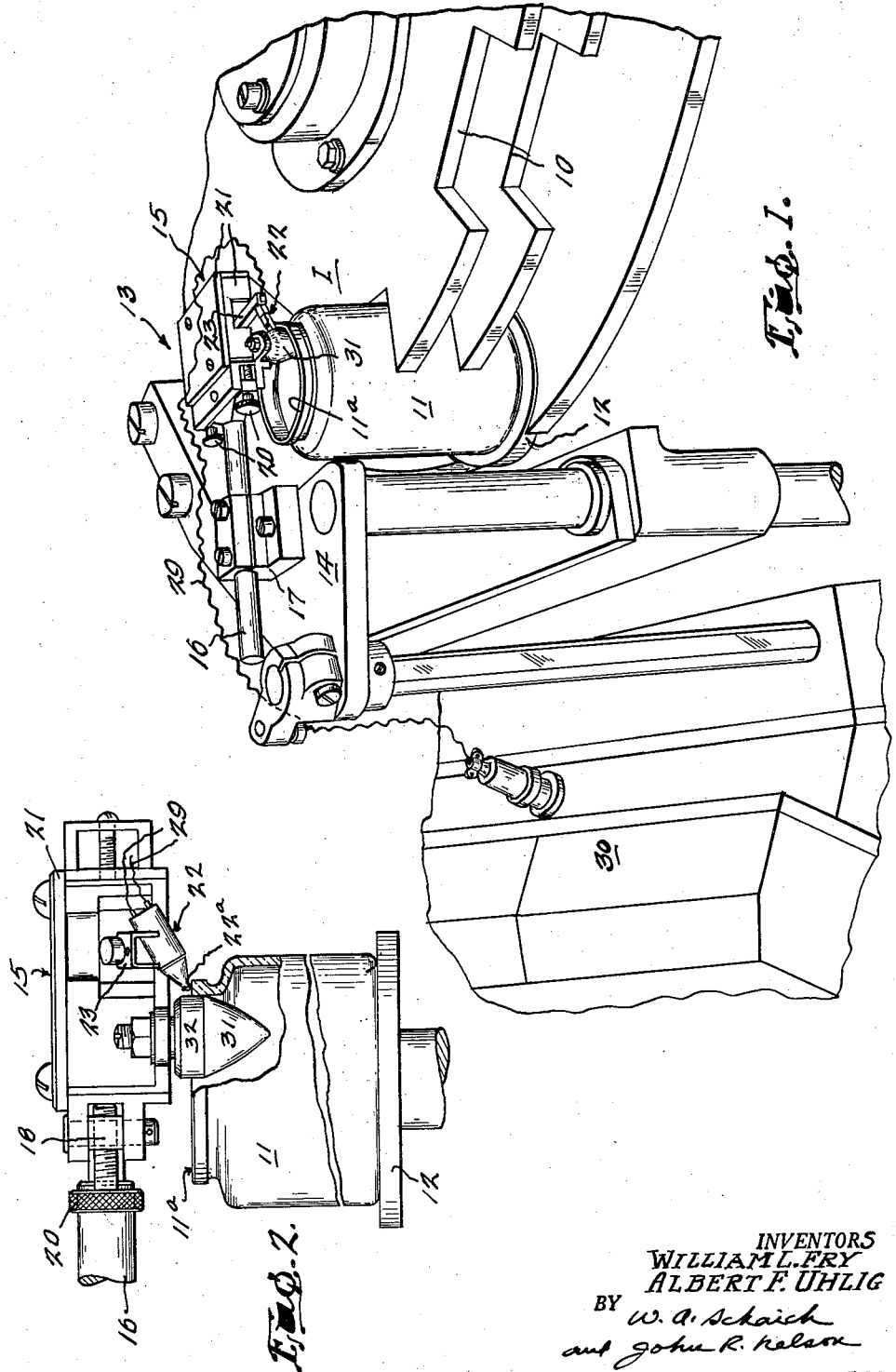
Aug. 20, 1963  W. L. FRY ETAL  3,101,147
GLASS CONTAINER INSPECTING APPARATUS
Filed May 17, 1961  3 Sheets-Sheet 1
INVENTORS
WILLIAM L. FRY
ALBERT F. UHLIG
BY
ATTORNEYS Aug. 20, 1963 W. L. FRY ETAL 3,101,147
GLASS CONTAINER INSPECTING APPARATUS
Filed May 17, 1961 3 Sheets-Sheet 2

INVENTORS
WILLIAM L. FRY
ALBERT F. UHLIG
BY W. A. Schaich
and John R. Nelson
ATTORNEYS United States Patent Office 3,101,147
Patented Aug. 20, 1963

3,101,147
GLASS CONTAINER INSPECTING APPARATUS
William L. Fry, Lafayette, and Albert F. Uhlig, Oakland, Calif., assignors to Owens-Illinois Glass Company, a corporation of Ohio
Filed May 17, 1961, Ser. No. 110,763
7 Claims. (Cl. 209—72)

Our invention relates to apparatus for inspecting glass containers for defects and more particularly is a device for detecting serious imperfections such as radial or tangential lines across the top sealing surface or rim of glass jars.

An important object of our invention is the provision of an inspecting device in which a sapphire needle of a conventional ceramic phonograph pick-up, or transducer, rides upon the sealing surface or rim of a glass jar and is deflected by cross-lines, etc. therein, such producing a low voltage current which then is amplified and utilized to operate suitable reject or ejecting mechanism.

Another object of our invention is the provision of novel and easily manipulated means for quickly adjusting the operating position of the "pick-up" in relation to a centering device which moves along the interior surface of the neck of a jar being inspected.

A further object of our invention is the provision of novel means for adjusting the height of the "pick-up" as required by the containers being inspected.

Other objects will be in part apparent and in part pointed out hereinafter.

In the accompanying drawings forming a part of our application:

FIG. 1 is a fragmentary perspective view showing our invention embodied in apparatus which brings jars one at a time to an inspecting station.

FIG. 2 is a detail sectional elevational view showing the centering roll or cone and "pick-up" in operating position.

Figure 3:
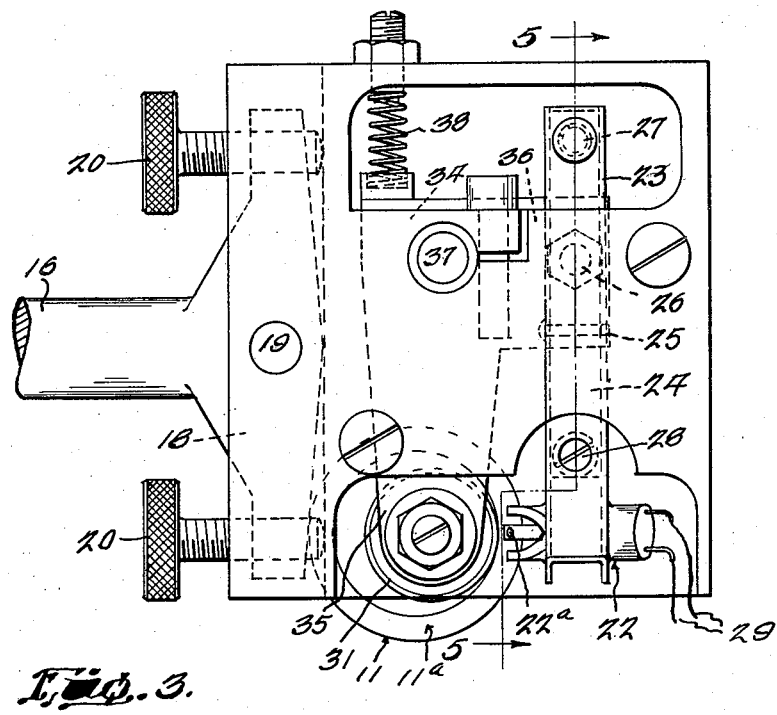
FIG. 3 is a top plan view of the inspecting device.

For illustrative purposes we have shown our inspecting device in conjunction with a conventional jar or container handling apparatus, which comprises an intermittently rotatable starwheel 10 mounted for rotation about a vertical axis. Such rotation brings jars 11 in succession to the inspecting station I where they are elevated into operative engagement with the inspecting device 13 and rotated about their axes by a vertically movable supporting pad 12.

To one side of the starwheel, adjacent the inspecting station I, is mounted a vertically adjustable horizontal supporting plate or bracket 14, for our inspecting device 13. As indicated in FIG. 1, this device is positioned directly above the jar supporting pad 12 at the inspecting station I, so that vertical upward movement of the loaded pad will bring the top sealing surface 11$^a$ of the jar, or such container, into operative engagement with the inspecting device.

This device, as illustrated, comprises a supporting frame or holder 15, of generally rectangular form mounted at the inner end of an arm 16 which extends horizontally over the bracket 14. A clamp device 17 supports the arm 16 so that it may be adjusted longitudinally as required by the particular diameter of the jar or other article being inspected. By shifting the arm as mentioned, the inspecting device is moved generally radially of the jar supporting pad 12. The connection between the arm 16 and holder 15 may comprise a cross-head 18, a vertical pivot pin 19 and manually adjustable set-screws 20 by means of which said holder may be moved about the pivot pin and held in proper position to effect the desired location of the holder in relation to the surfaces being inspected. This will become more readily understood presently. The top and some sides of the holder may be covered by lucite plates 21, as shown, if desired.

Figure 4:
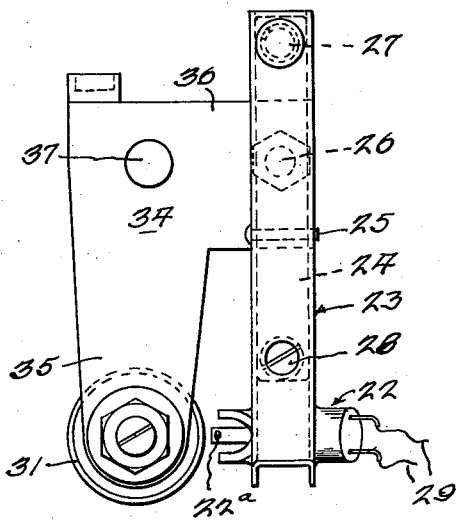
FIG. 4 is a top plan view of the "pick-up" device, centering means and carrier plate for both.
Figure 5:
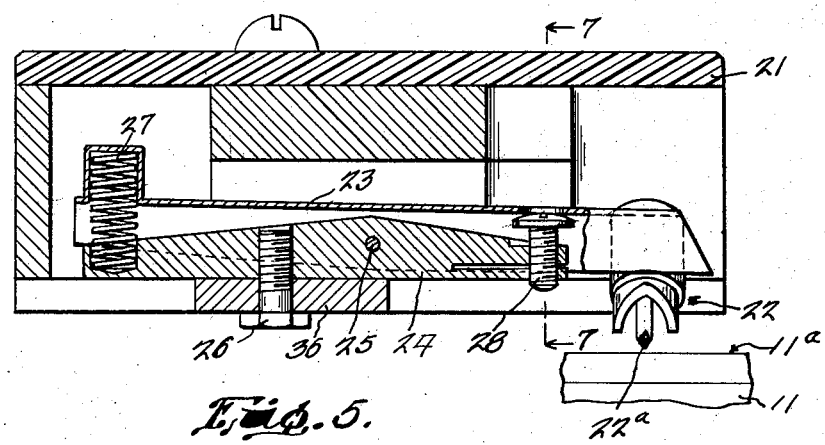
FIG. 5 is a vertical sectional view taken substantially along the line 5—5 of FIG. 3.
Figure 6:
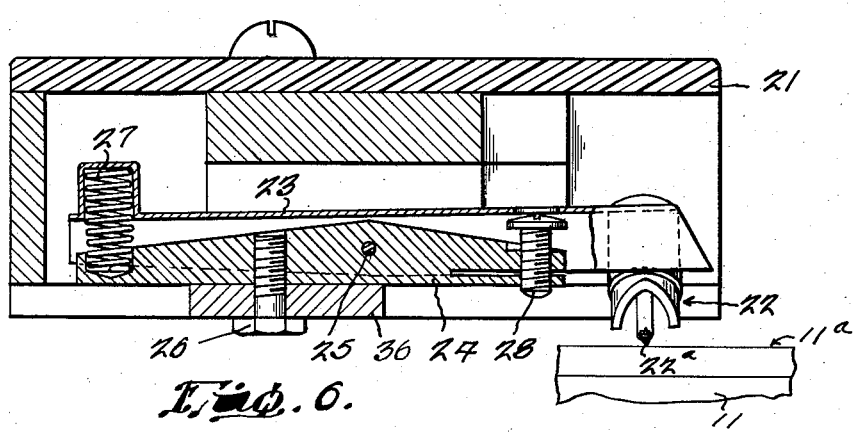
FIG. 6 is a view similar to FIG. 5, but with the "pick-up" needle contacted by the sealing surface of the container.
Figure 7:
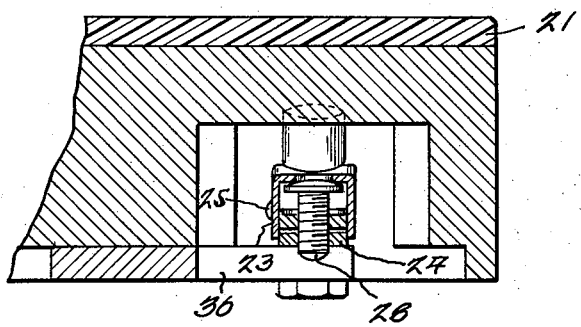
FIG. 7 is a fragmentary detail sectional view taken along the plane of line 7—7 of FIG. 5.

Mounted within the holder 15 is a pick-up transducer unit (FIGS. 3–7) which may comprise a conventional electro-voice transducer or phonograph transducer 22 mounted at the free end of a relatively long horizontal arm 23 and carrying a sapphire needle 22$^a$ for contact with the jar rim. This arm is, or may be, inverted U-shape in cross-section and straddles an elongated bar 24, these elements being pivoted together by a horizontal pivot pin 25. As shown, the upper side of this bar slopes away from the area of the pivot pin in both directions to provide clearance which will allow limited rocking of the arm 23 about its pivot. A coil expansion spring 27 yieldingly urges the transducer carrying end of the arm 23 downwardly. An adjustable stop-screw 28, self-locking, is threaded in the elongated bar 24 with the head uppermost for contact with the under side of said arm 23 near the transducer. With this arrangement it is understood that elevation of a jar by the pad 12 brings the top sealing surface or rim of the jar into engagement with the needle 22$^a$. The upward movement is slightly in excess of that needed merely to effect physical contact between these elements and as a result the arm is moved slightly about its pivot pin 25, placing the coil spring under added compression. Thus the needle 22$^a$ is firmly held in contact with the surface being inspected. With rotation of the jar about its axis, any cross-lines, grooves or ridges in this surface will cause deflection of the needle 22$^a$ and the production of low-voltage current in the transducer 22. This transducer, through conductors 29, is connected to an amplifier unit 30 of conventional form.

A reject device (not shown) of any of the many available, is operated by the amplified current to remove a defective jar.

It is important that the needle 22$^a$ of the pick-up be accurately positioned for contact with the sealing surface of the jar. To this end we provide a freely rotatable conical centering device 31, positioned adjacent the needle 22$^a$ with its apex facing downwardly. The upper section of this centering cone 31 may well be a short straight-sided cylindrical surface 32 which will contact the interior surface of the jar neck. This is important in effecting proper radial location of the needle 22$^a$ on the sealing surface.

A substantially L-shaped carrier plate 34 (FIGS. 3 and 4) supports this centering cone 31, the cone being suspended from the free end of the longer arm 35 of the plate and, as indicated in FIG. 1, also being eccentrically mounted to permit fine adjustment with respect to the needle 22$^a$. The other, or shorter arm 36, of the carrier plate extends beneath the aforementioned elongated bar 24 and is secured thereto by a screw 26. This assembly, including the arm 23, bar 24 and carrier plate 34, is pivoted to the holder 15 by a vertical pivot pin 37. A coil expansion spring 38 (FIG. 3), adjustable as to tension, yieldingly urges the assembly in a counter-clockwise direction about the pivot pin 37, thereby normally initially positioning some part of the conical surface of the centering cone directly over the jar rim. Thus, as a jar is lifted, the rim contacts the cone and shifts it laterally against pressure of the spring 38 insuring proper predetermined positioning of the needle 22ª upon the rim or sealing surface.

Modifications may be resorted to within the spirit and scope of the appended claims.

We claim:

1. In apparatus for inspecting the sealing surface of a glass container for irregular surface formations, a phonograph-type transducer having a needle for sliding contact with said surface, means for rotating said surface with the needle in contact therewith, yielding means for maintaining such contact, rejection mechanism actuating means comprising an amplifier connected to said transducer, a centering cone adjacent the needle, said cone insertible into the container just in advance of contact between the needle and sealing surface and rollingly engaging only a minor segment of a surface of the container to insure proper contact between the needle and sealing surface.

2. In apparatus as defined in claim 1, the cone and needle having a common mounting and spring means urging the mounting to a position in which the needle will contact said sealing surface.

3. In apparatus as defined in claim 1, a common support for the transducer and centering cone and said yielding means being a horizontal pivoted arm connected at one end to the transducer and a spring acting upon the other end of the arm to urge the transducer and needle downwardly.

4. In inspecting apparatus, a carrier plate of generally L-shape, a vertically rockable arm of inverted U-shape in cross-section mounted upon one end of the carrier plate, a transducer and needle at one end of said arm, a centering cone adjacent to the transducer and mounted at the other end of said plate, spring means urging the arm in a direction to lower the transducer, and a stop for limiting such lowering.

5. In apparatus as defined in claim 4, there being an elongated horizontal bar which the arm straddles, and a horizontal pivot pin connecting medial points of the bar and arm.

6. Apparatus as defined in claim 5, a holder for said carrier plate, a vertical pivot pin connecting the plate and holder and spring means urging the plate about its pivot in one direction.

7. In apparatus for inspecting the sealing surface of a glass container for irregular surface formations, a phonograph-type transducer having a needle for sliding contact with said surface, means for rotating said surface with the needle in contact therewith, yielding means for maintaining such contact, a centering cone insertible into the container to control the position of the needle on said surface, a common support for the transducer and centering cone, said yielding means being a horizontal pivoted arm connected at one end to the transducer, a spring acting upon the other end of the arm to urge the transducer and needle downwardly, the pivoted arm being rockable vertically, a vertical pivot for said support, spring means urging the support about its pivot to effect contact between the cone and container and rejection mechanism actuating means comprising an amplifier connected to said transducer.

References Cited in the file of this patent

UNITED STATES PATENTS

| | | |
|---|---|---|
| 2,575,227 | Morcom | Nov. 13, 1951 |
| 2,778,497 | Bickley | Jan. 22, 1957 |
| 2,800,226 | Drennan | July 23, 1957 |